Feb. 26, 1974   L. W. NIEDRACH ET AL   3,794,575

OXYGEN SENSOR

Filed Oct. 30, 1972

United States Patent Office

3,794,575
Patented Feb. 26, 1974

3,794,575
OXYGEN SENSOR
Leonard W. Niedrach and Willard T. Grubb, Schenectady, N.Y., assignors to General Electric Company
Filed Oct. 30, 1972, Ser. No. 301,987
Int. Cl. G01n 27/46
U.S. Cl. 204—195 P                    9 Claims

ABSTRACT OF THE DISCLOSURE

An oxygen sensor has a first electrode of a corrodible metallic base member, a second electrode of a noble metal coupled electrically to the metal of the first electrode, a third electrode surrounding at least a portion of the metal of the first electrode, the third electrode comprising silver with at least a partial layer of silver halide thereon, a first layer of electrical insulation disposed between the first and third electrodes, a second layer of electrical insulation disposed over the third electrode, an aqueous electrolyte contacting at least a portion of the first electrode, the second electrode, and the silver halide layer of the third electrode, and an outer sheath of oxygen permeable ion-impermeable diffusion barrier material encapsulating at least the electrolyte, and the portions of the first electrode, the second electrode, and the silver halide layer of the third electrode in contact with the electrolyte.

---

Reference is made to copending patent application entitled "Sensor and Method of Manufacture" filed Sept. 4, 1970, and given Ser. No. 69,650, now U.S. Pat. No. 3,714,015, which describes and claims a sensor including an ion exchange resin electrolyte and methods of manufacture. This copending application, in the name of Leonard W. Niedrach, is assigned to the same assignee as the present application.

Reference is made to copending patent application entitled "Potentiometric Oxygen Sensor" in the name of Robert A. Macur, filed Oct. 5, 1972 and given Ser. No. 295,248, which describes and claims a potentiometric oxygen sensor which sensor has an electrode which reduces oxygen and which itself corrodes or oxidizes to produce a potential that varies with the rate of oxygen reduction which in turn is dependent upon the partial pressure of oxygen at the electrode surface. A silver halide reference electrode is encapsulated in a common electrolyte with the first electrode. The electrolyte is surrounded by an oxygen permeable, ion-impermeable membrane. The electrolyte includes a halide salt and a buffer. This copending application is assigned to the same assignee as the present application.

The present invention relates to oxygen sensors and, more particularly, to oxygen sensors employing a corrodible metal electrode coupled to a noble metal electrode.

Oxygen sensors are known in the prior art for determining oxygen content of a sample. Such a sensor has a pair of electrodes that are connected by means of an electrolyte medium. The electric circuit parameters of this device change when exposed to materials having different oxygen content as for example, oxygen from blood when passing into the electrolyte provides a current flow in the circuit between the two electrodes which increases with increasing oxygen content of the sample. A membrane is positioned over the cathode to maintain the electrolyte in position. Such a membrane is selectively permeable so that it passes substances of interest while blocking other substances that might interfere with or be detrimental to the measuring operations.

Corrodible base-metal oxide electrodes are known in the prior art. For example, in U.S. Letters Patent 3,462,353 entitled "Reference Electrodes of Particular Utility in Anodic Corrosion Protection Systems," there are described in column 19, lines 1–22 a number of such electrodes which are useable as reference electrodes. In the above reference, there are recited electrodes of molybdenum-molybdenum oxide, manganese-manganese oxide, cobalt-cobalt oxide, nickel-nickel oxide, chromium-chromium oxide, tungsten-tungsten oxide, tantalum-tantalum oxide, and zirconium-zirconium oxide.

Our present invention is directed to an improved oxygen sensor which employs a corrodible metal electrode coupled to a noble metal electrode.

The primary objects of our invention are to provide a rugged and dependable oxygen sensor, which is suitable for biomedical, environmental control, and other applications.

In accordance with one aspect of our invention, an oxygen sensor comprises a first electrode of a corrodible metallic base member, a second electrode of a noble metal coupled electrically to the metal of the first electrode, a third electrode surrounding at least a portion of the metal of the first electrode, the third electrode comprising silver with at least a partial layer of silver halide thereon, a first layer of electrical insulation disposed between the first and third electrodes, a second layer of electrical insulation disposed over the third electrode, an aqueous electrolyte contacting at least a portion of the first electrode, the second electrode, and the silver halide layer of the third electrode, and an outer sheath of oxygen permeable, ion-impermeable diffusion barrier material encapsulating at least the electrolyte, and the portions of the first electrode, the second electrode, and the silver halide layer of the third electrode in contact with the electrolyte.

These and various other objects, features and advantages of the invention will be better understood from the following description taken in connection with the accompanying drawing in which.

Figure 1:
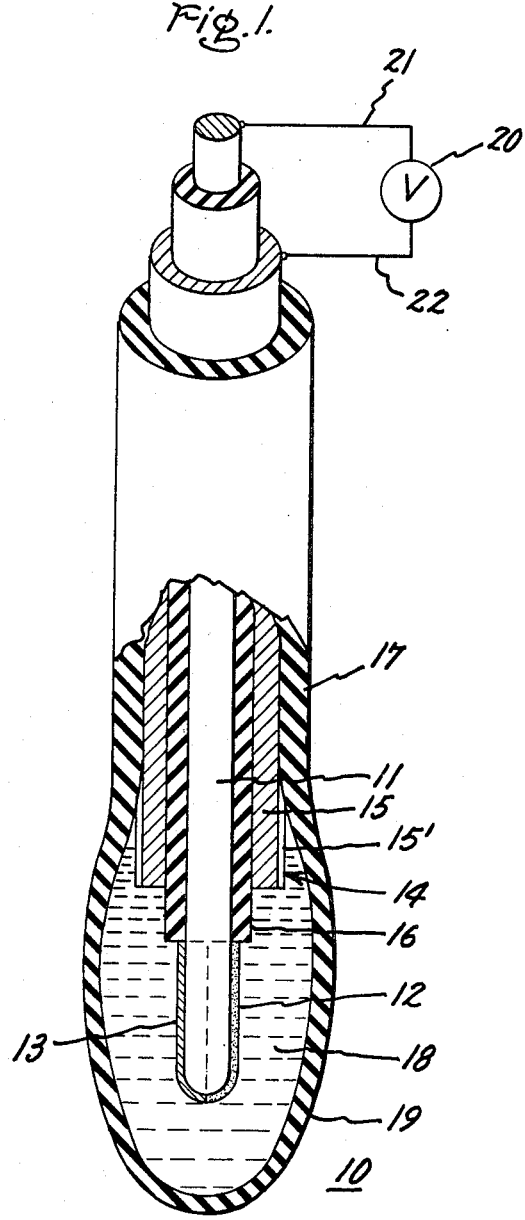
FIG. 1 is a partial sectional view of a portion of an oxygen sensor made in accordance with our invention.

In FIG. 1 of the drawing, there is shown generally at 10 a portion of an oxygen sensor embodying our invention. Sensor 10 is shown with a first electrode 11 of a corrodible metallic base member in the form of a thin wire. A superficial oxide 12 of the respective metal is shown covering a portion of member 11 adjacent one end thereof. A second electrode 13 of a noble metal is coupled electrically to the metal surface of electrode 11 by being deposited thereon, in electrical contact with the corrodible metal, by electroplating, electroless plating, evaporation, sputtering or other suitable means. A third electrode 14 is shown comprising a silver tube 15 with a layer of silver halide 15' on its lower portion. A first layer of electrical insulation 16 is disposed between first electrode 11 and third electrode 15 in the form of a tube, coating, etc. A second layer of electrical insulation 17 is disposed over third electrode 14. An aqueous electrolyte 18 contacts metal oxide 12 of first electrode 11, second electrode 13 and the silver halide surface 15' of the third electrode 14. An outer sheath 19 of oxygen permeable, ion-impermeable diffusion barrier material encapsulates at least metal oxide 12 of first electrode 11, second electrode 13 and the silver halide layer 15' of electrode 14. A high impedance voltmeter 20 is shown connected to electrode 11 by means of a lead 21 and connected to silver tube 15 by an electrical lead 22.

Figure 2:
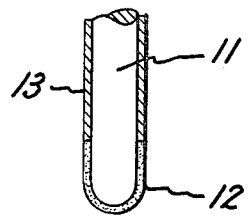
FIG. 2 is a sectional view of a modified electrode structure for use in the sensor of FIG. 1.

In FIG. 2 of the drawing there is shown a partial sectional view of a modified electrode structure. The lower end of first electrode 11 is shown with a superficial oxide layer 12 covering a portion thereof at its end. A second noble metal electrode 13 is coupled to the metal surface of electrode 11 by having the noble metal electroplated thereon.

Figure 3:
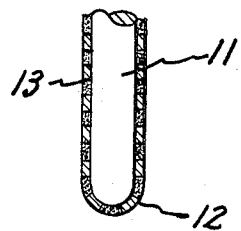
FIG. 3 is a sectional view of a further modified electrode structure for use in the sensor of FIG. 1.

In FIG. 3 of the drawing there is shown a partial sectional view of a further modified electrode structure. A second electrode 13 of a noble metal is shown deposited as a porous layer on the metallic surface of electrode 11. In this manner noble metal electrode 13 is coupled to electrode 11. Superficial oxide layer 12 covers a portion of electrode 11 by being located in the pores of second electrode 13.

Figure 4:
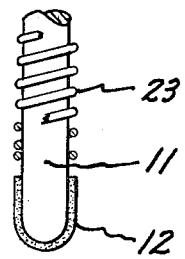
FIG. 4 is a sectional view of a still further modified electrode structure for use in the sensor of FIG. 1.

In FIG. 4 of the drawing there is shown a further modified electrode structure wherein first electrode 11 has a superficial oxide layer 12 covering a portion thereof at its end. A second electrode 23 of noble metal is coupled to the metal surface of electrode 11. Electrode 23 is shown in the form of a spiral wire surrounding the exposed metal surface of electrode 11 and connected therewith.

We found that we could form the above improved oxygen sensors by a method of applying successive elements from various solutions after which each solution solvent was evaporated. The application of the successive layers is preferably accomplished by immersion steps but other suitable means include coating, spraying, brushing, etc. The use of immersion steps are described and claimed in the above referenced patent application Ser. No. 65,650.

The oxygen sensor of our invention can be formed by employing for the initial support wire which forms the first electrode, a corrodible metallic base member such as tungsten. Other corrodible base metals can also be employed, such as tantalum, molybdenum or other suitable mildly corrodible metals or alloys thereof. Tungsten, tantalum and molybdenum are preferred for the base member. A superficial layer of the corrodible base member oxide may cover a portion of the tungsten wire preferably at one end thereof. The first electrode is described and claimed as a corrodible metallic base member. Since a superficial oxide generally forms on such a member, its description is included. Thus, corrodible metallic base member includes the metal alone, or the metal with a superficial oxide coating on at least a portion thereof. Alternatively, one may take steps to deliberately form an oxide on the surface such as by anodization, thermal treatment in air, etc. The second electrode is made of a noble metal which electrode is coupled electrically to the metal of the first electrode in various manners. For example, the noble metal electrode can be coupled by electroplating the noble metal directly on a portion of the metallic surface of the first electrode. The noble metal can be alloyed with the corrodible base metal. A porous layer of noble metal can be deposited on the metallic surface of the first electrode. Further, such a noble metal electrode can be in the form of a spiral which surrounds the metallic surface of the first electrode. Further, the second electrode can be in the form of a wire which is surrounded by a spiral of the corrodible base member.

Various electrical insulating materials are useable and can be applied by coating steps. Preferred materials include hexafluoropropylene - vinylidene fluoride rubber, polyester resin lacquer, silicone rubbers, polyolefins, epoxy resins, etc. We prefer to employ a polyester resin lacquer which provides the desired electrical insulation and which can be applied by coating or dipping. The polyester resin lacquer can be cross-linked by heating to insolubility and therefore facilitates the application of successive layers. We found that various oxygen diffusion barrier materials are suitable as an outer sheath to encapsulate the electrolyte, and the portions of the first electrode, the second electrode and the silver halide layer of the third electrode in contact with the electrolyte. The oxygen permeable ion-impermeable diffusion barrier material must have high resistivity and have an appropriate permeability coefficient for the oxygen to be sensed. Since these materials have high electrical resistivities the oxygen diffusion barrier sheath and the second layer of insulation can be made with one of these materials. Thus, the second support layer of electrical insulation can be eliminated as a separate item. Suitable materials include silicone - polycarbonate copolymers, hexafluoropropylene-vinylidene fluoride rubber and silicone rubbers.

The third electrode is a silver-silver halide electrode. This electrode can be formed by depositing a silver chloride layer on a silver base such as a silver tube. Other silver halides except fluorides are useful.

A broad range of aqueous electrolytes can be employed. Such suitable electrolytes include an aqueous solution of a halide salt corresponding to the silver halide salt, for example, potassium chloride or sodium chloride. A buffer is also included which is in the vicinity of pH 5.0, for example, a borate or a phosphate buffer. A gelling agent can also be incorporated into the aqueous electrolyte providing a gelled solution which can be applied readily to the electrodes. For example, suitable gelled aqueous electrodes include an aqueous solution of a soluble halide salt corresponding to the halide in the silver halide layer, a buffering couple such as borate or phosphate preferably in the vicinity of pH 5.0, and a gelling agent. Such gelling agents include agar, methyl cellulose, ethyl cellulose, guar gums, polyacrylates, polyethers, polyamides, etc.

As set forth in the above-identified copending patent application, Ser. No. 295,248, it is shown that potentiometric oxygen sensors with a corrosion base metal function as shorted electrochemical cells in which the corrodible base metal is both an oxygen reduction cathode and a corrodible base metal-oxidizing anode. The operating potential of such an electrode is the point on which the anodic and cathodic polarization curves intersect. The effect of oxygen partial pressure upon the cathodic polarization curve then makes the potential at the point of intersection sensitive to the ambient oxygen content. Thus, the behavior of such sensors is determined by the characteristics of the single electrode material towards self corrosion and oxidation reduction.

We have found unexpectedly that we could alter this behavior by electrically coupling a noble metal electrode directly to the metal of the corrodible base metal electrode. In this manner the reduction of oxygen is facilitated thereby shifting the potential region in which the system operates. Its further advantage is preventing deposition of silver from the silver-chloride counter electrode onto the corrodible base metal electrode.

Examples of electrode structures and oxygen sensors made in accordance with our invention are as follows:

EXAMPLE I

Two electrode structures were made by employing two 30 mil tantalum wires which were suitably insulated with heat shrinkable polyethylene tubing. One half inch lengths of each wire were left exposed at opposite ends. Each wire was then grit blasted to clean and roughen the surface. Each wire was then subjected to 5 minute anodization in about 1.15 N phosphate buffer at pH 5.0. The anodizations were performed at 1.0 and 100 volts positive to a larger tantalum electrode which served as a cathode.

EXAMPLE II

Polarization curves were obtained for these two electrodes in nitrogen purged phosphate buffer at pH 5.0. Upon shifting to oxygen a steady state mixed potential was furnished as a result of the balancing of the corrosion current of the tantalum and the cathodic reduction of oxygen on the oxidized tantalum surface. The electrodes were then shifted from oxygenation to aeration of the solution wherein the potentials of the electrodes responded to the change in the oxygen level. These changes are shown below in Table I which appears in Example IV.

EXAMPLE III

The above electrodes described in Examples I and II were then electrochemically coupled to a rhodium electrode of similar area and a platinum electrode of a similar area, respectively. These coupled electrodes were then tested in the same manner as the $O_2$ electrodes in Example II. In view of a more ready reduction of oxygen on the surfaces of noble metal electrodes a rapid shifting in potential from negative to strictly positive values occurred. Such a response to change in the oxygen level from air to pure oxygen also occurred rapidly. These measurements are also shown below in Table I of Example IV.

EXAMPLE IV

Table I below sets forth the change in potential for the electrodes tested above in Examples II and III. The electrodes are identified by numbers 1 and 3 for the tantalum wire alone. Electrodes 1 and 2 are an electrode structure of the tantalum wire with a rhodium electrode coupled thereto. Electrodes 3 and 4 are the tantalum electrode with a platinum electrode coupled thereto. The voltage in oxygen is set forth in millivolts. The response between air and pure oxygen is set forth as the change in millivolts. The voltage of the respective electrodes is ascertained by employing a saturated calomel reference electrode.

TABLE I

| Electrode(s) | Voltage in oxygen (mv.) | Response between air and $O_2$, $\Delta$mv. |
|---|---|---|
| 1 | −64 | +47 |
| 1 and 2 | +382 | +35 |
| 3 | −96 | +91 |
| 3 and 4 | +423 | +34 |

While other modifications of the invention and variations thereof which may be employed within the scope of the invention have not been described, the invention is intended to include such as may be embraced within the following claims.

What we claim as new and desire to secure by Letters Patent of the United States is:

1. An oxygen sensor comprising a first electrode of a corrodible metallic base member, said base member consisting of a metal selected from the class consisting of tungsten, tantalum, molybdenum, and alloys thereof, a layer of corrodible base member oxide covering at least a portion of the base member, a second electrode of a noble metal coupled electrically to the metal of the first electrode, a third electrode surrounding at least a portion of the metal of the first electrode, the third electrode comprising silver with at least a partial layer of silver halide thereon, a first layer of electrical insulation deposited between the first and third electrodes, a second layer of electrical insulation deposited over the third electrode, an aqueous electrolyte contacting at least a portion of the first electrode, the second electrode, and the silver halide layer of the third electrode, and an outer sheath of oxygen permeable, ion-impermeable diffusion barrier material encapsulating at least the electrolyte, and the portions of the first electrode, the second electrode, and the silver halide layer of the third electrode in contact with the electrolyte.

2. An oxygen sensor as in claim 1, in which the noble metal electrode is coupled to the first electrode by being electrodeposited on a portion of the metallic surface of the first electrode.

3. An oxygen sensor as in claim 1, in which the noble metal electrode is coupled to the first electrode by being alloyed with the corrodible base metal.

4. An oxygen sensor as in claim 1, in which the noble metal electrode is in the form of a wire spiral surrounding the metallic surface of the first electrode and coupled thereto by physical contact.

5. An oxygen sensor as in claim 1, in which the noble metal electrode is coupled to the first electrode by being deposited as a porous layer on the metallic surface of the first electrode.

6. An oxygen sensor as in claim 1, in which the noble metal electrode is surrounded by a corrodible base member electrode in the form of a wire spiral.

7. An oxygen sensor as in claim 1, in which the aqueous electrolyte contains a gelling agent.

8. An oxygen sensor as in claim 1, in which the first electrode is a tantalum wire, the second electrode is rhodium metal, the first insulation is polyester resin lacquer, and the second insulation and diffusion barrier are a silicone polycarbonate copolymer.

9. An oxygen sensor as in claim 1, in which the first electrode is a tantalum wire, the second electrode is platinum metal, the first insulation is polyester resin lacquer, and the second insulation and diffusion barrier are a silicone polycarbonate copolymer.

References Cited

UNITED STATES PATENTS 3,313,720  4/1967  Robinson _____ 204—195 P
3,705,088  12/1972  Niedrach et al. ____ 204—195 P GERALD L. KAPLAN, Primary Examiner